US007340405B1

(12) United States Patent
Günther et al.

(10) Patent No.: US 7,340,405 B1
(45) Date of Patent: Mar. 4, 2008

(54) METHOD AND SYSTEM FOR DEVELOPING OPTIMIZED SCHEDULES

(75) Inventors: Dirk P. Günther, Grapevine, TX (US);
Ellis L. Johnson, Atlanta, GA (US);
Ladislav Lettovsky, Ithaca, NY (US);
Barry C. Smith, Flower Mound, TX (US)

(73) Assignee: Sabre Inc., Southlake, TX (US)

( * ) Notice: Subject to any disclaimer, the term of this patent is extended or adjusted under 35 U.S.C. 154(b) by 1444 days.

(21) Appl. No.: 09/658,866

(22) Filed: Sep. 8, 2000

(51) Int. Cl.
*G06Q 10/00* (2006.01)
*G06F 17/30* (2006.01)
(52) U.S. Cl. .......................................... 705/6; 705/10
(58) Field of Classification Search ................ 705/5, 705/6, 7, 10, 400
See application file for complete search history.

(56) References Cited

U.S. PATENT DOCUMENTS

| | | | | |
|---|---|---|---|---|
| 4,926,343 | A | 5/1990 | Tsuruta et al. | 706/45 |
| 5,652,867 | A * | 7/1997 | Barlow et al. | 703/6 |
| 6,076,067 | A | 6/2000 | Jacobs et al. | 705/7 |
| 6,134,500 | A | 10/2000 | Tang et al. | 701/202 |
| 6,263,315 | B1 * | 7/2001 | Talluri | 705/8 |
| 6,314,361 | B1 * | 11/2001 | Yu et al. | 701/120 |

FOREIGN PATENT DOCUMENTS

WO  WO 9212492 A2 *  7/1992

OTHER PUBLICATIONS

Hillier, Frederick S.; Lieberman, Gerald S., Introduction to Operations Research, McGraw-Hill, Inc., 1995, 6th ed., pp. 494-495.*
Mathaisel, Dennis F.X.; "Fleet Assignment with Variable Demand: A Goal Programming Approach"; Aug. 1983, pp. 1-22.
Demoures, Pierre-Yves; "A Medium-Haul Fleet Planning Model"; 24th AGIFORS Symposium; Sep. 24-27, 1984, pp. 123-151.
Barnhart, Cynthia, etc.; "Airline Schedule Design"; Undated, pp. 2070-2072.
Kim, Daeki, et.; "Multimodal Express Package Delivery: A Service Network Design Application"; Transportation Science, vol. 33, No. 4, Nov. 1999, pp. 391-407.
Etschmaier, M.; "Schedule Construction and Evaluation for Short and Medium Range Corporate Planning"; Oct. 30, 1970, pp. 1-24; with attached "Comments on M. Etschmaier's Paper", Nov. 1970.
Phillips, Robert L., etc., "An Integrated Approach to Airline Fleet and Schedule Planning"; Decision Focus Incorporated, pp. 284-298.
Berge, M.; "Timetable Optimization, Forumulation, Solution Approaches, and Computational Issues"; Oct. 1994, pp. 341-357.

(Continued)

*Primary Examiner*—Jeffrey A. Smith
*Assistant Examiner*—Rachel L. Porter
(74) *Attorney, Agent, or Firm*—Alston & Bird LLP (57) ABSTRACT

In accordance with the present invention a process is provided for optimizing a schedule of legs employed in transporting objects between geographic markets. The process identifies a set of itineraries for serving a set of markets, and then generates a set of market plans for each market. Each market plan comprises a modified set of the itineraries for the market. The profitability of each market plan is then determined, and a selection is made from the set of market plans of a subset thereof that optimizes overall profit of the schedule.

17 Claims, 7 Drawing Sheets

OTHER PUBLICATIONS

Kim, D., et al.; "Multimodal Express Package Delivery: A Service Network Design Application"; Transportation Science © 1999 INFORMS, vol. 33, No. 4, Nov. 1999; pp. 391-407.

Antes, "Structuring the Process of Airline Scheduling," *Lambda Universit "at zu K" oln Seminar f'ur Wirtschaftsinformatik und Operations Research*, 8 pages (1997).

Jacobs, et al, "Soaring with Synchronized Systems, Coordinated Scheduling, Yield Management and Pricing Decisions Can Make Airline Revenue Take Off," *ORMS Today*, 13 pages (2000).

Kliewer, "Integrating Market Modeling and Fleet Assignment," *University of Paderborn Department of Mathematics and Computer Science*, 5 pages.

McGill, et al., "Revenue Management: Research Overview and Prospects," *Transportation Science*, 33(2): 233-256 (1999).

Sylla, "Operations Research in the Airline Industry,"*Sabre, Inc.*, 46-62 (2000).

\* cited by examiner

METHOD AND SYSTEM FOR DEVELOPING OPTIMIZED SCHEDULES

BACKGROUND OF THE INVENTION

A. Field of the Invention

This invention generally relates to methods and systems for developing optimized schedules and, more particularly, to methods and systems employed to develop optimized schedules in the transportation field, such as the commercial airline industry.

B. Description of the Related Art

Schedule optimization is the process of selecting an arrangement of resources to maximize a desired benefit. In the airline industry, this process involves the selection and arrangement of flights (or legs) into a schedule that maximizes airline profit.

Figure 1:
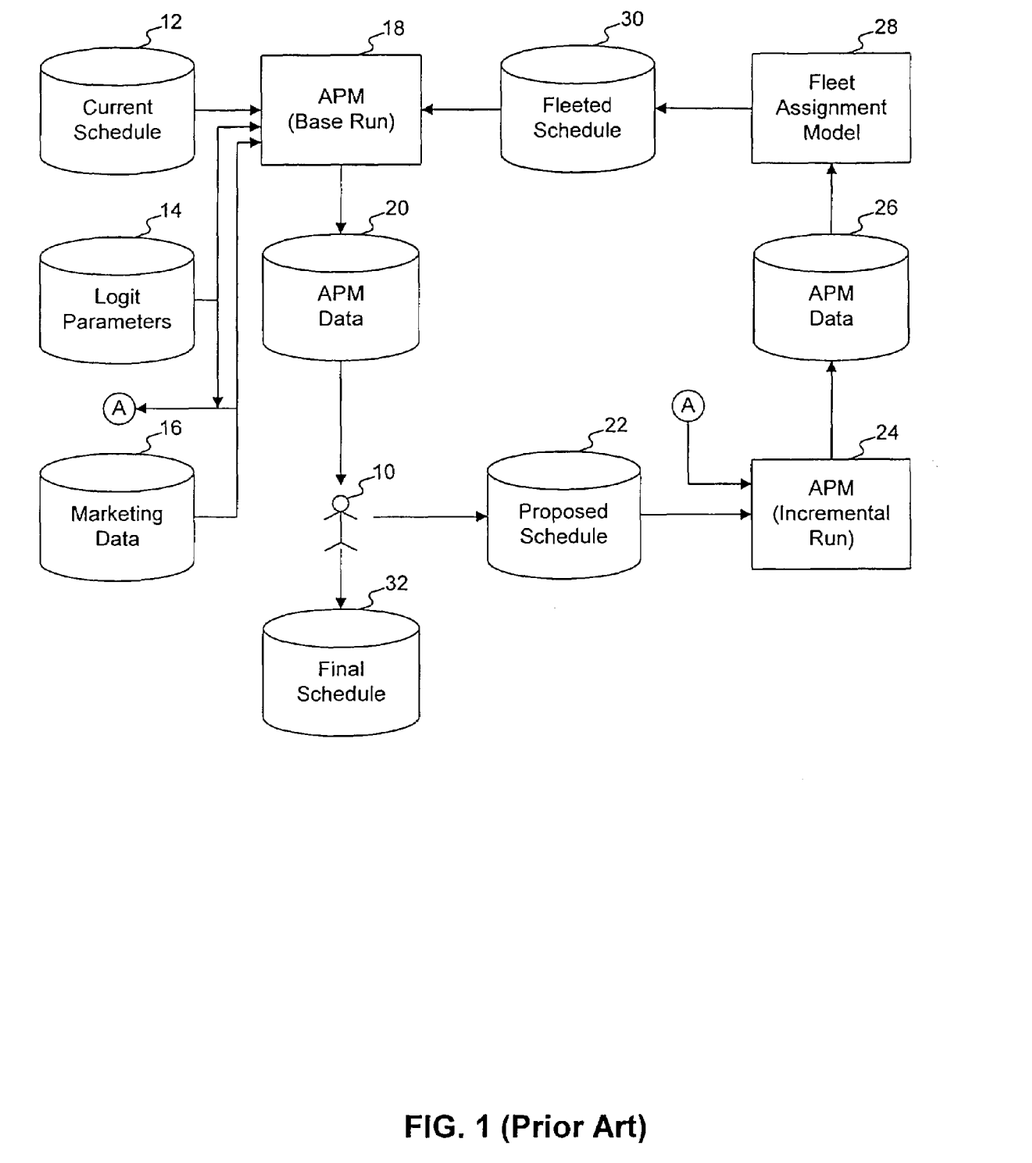
FIG. 1 is a schematic block diagram of a prior art process for schedule generation.

FIG. 1 depicts the process currently employed for schedule optimization in the airline industry. Underlying the process, one or more schedulers 10 utilize a computer system to selectively run a pair of conventional applications known in the art as the airline profitability model (APM) and the fleet assignment model (FAM).

During initialization, the APM receives a current schedule 12 of flights, logit parameters 14, and marketing data 16. The current schedule 12 typically includes the arrival and departure times, and the equipment assignments for all flights of the host airline (HA), the airline seeking schedule optimization. The current schedule 12 generally also includes similar information for all other airlines (OAs). The logit parameters 14 represent well-known estimates for the level of importance that the public may place on various aspects of a flight, such as whether a flight is non-stop. The marketing data 16 typically includes the total demand for flights in various markets.

Thereafter, the APM performs a conventional base run 18 on the input data to produce APM data 20. Among the APM data 20 produced are cost, demand, and revenue estimates for the current schedule 12 on a per flight, per itinerary, or per market basis, as desired. As used herein, a flight is a non-stop service in between an origination and a destination (the pair defining a market), while an itinerary is one or more interconnected flights.

The scheduler 10 then reviews the APM data 20 to identify changes that may improve the HA's schedule. Such changes may include adding a flight, canceling a flight, shifting the departure time of a flight, altering the frequency of a flight, and the like. Assuming that a potentially desirable change is identified, the scheduler 10 creates a proposed schedule 22 by manually incorporating the change into the current schedule 12. This step is no small matter, for nearly any change to a schedule must be made under the inherent constraints imposed by the rest of the schedule. For example, adding a new flight may mean that an existing flight needs to be canceled, which could also impact other flights in the schedule.

Assuming that the scheduler 10 is able to incorporate the change, the scheduler 10 directs the APM to perform a conventional incremental run 24 on the proposed schedule 22. The APM data 26 output includes cost, demand, and revenue estimates for the proposed schedule 22. This output is then fed to a conventional fleet assignment model (FAM) 28, which produces a fleeted schedule 30 consistent with the APM data 26. The fleeted schedule 30 is then run through the APM to produce APM data 20 indicating cost, demand, and revenue based on the fleeting of the proposed schedule 22. At this point, the scheduler 10 compares the APM data 20 just produced with that generated from the original schedule 12 to see if the change incorporated into the proposed schedule 22 increased HA profit. Profitable changes are ultimately made part of a final schedule 32.

However, as is often the case, several iterations of this time-consuming process are required to confirm the discovery of even a single profitable change to the schedule. Another significant issue facing the scheduler 10 is that there are so many changes that could logically be considered for entry into the schedule. As such, it is desirable to be able to incorporate multiple changes into the proposed schedule 22 for consideration.

Unfortunately, as those skilled in the art appreciate, the nature of conventional APMs and FAMs limits the number of possible changes that may be considered at one time. Specifically, running an APM on a "heavily overbuilt schedule" (i.e., a schedule with several proposed changes incorporated therein) produces inaccurate demand estimates. Generally, this inaccuracy increases as the difference between the proposed schedule 22 and the fleeted schedule 30 becomes larger relative to the overall size of the fleeted schedule 30. Consequently, only small incremental changes to a proposed schedule 22 can be evaluated with any reasonable degree of accuracy. Moreover, those skilled in the art know that the FAM is similarly limited to fleeting proposed schedules 22 with relatively few incorporated changes.

In summary, the present process is time and resource inefficient based on the combined effects of having to: (1) manually identify and incorporate proposed changes into a schedule; and 2) limit to relatively few the number of proposed changes for testing in a single run of the APM and FAM models. There is therefore a need for a method and system to overcome these and other limitations of the prior art approach.

SUMMARY OF THE INVENTION

Accordingly, systems and methods consistent with the present invention substantially obviate one or more of the problems due to limitations, shortcomings, and disadvantages of the related art by automating the schedule generation process.

In accordance with the present invention, as embodied and broadly described herein, a method for optimizing a schedule of legs employed in transporting objects between geographic markets is delineated. The method includes the steps of: (1) identifying a set of itineraries for serving each market in a set of markets, where each itinerary comprises one or more legs; (2) generating a set of market plans for each market, where each market plan comprises a modified set of the itineraries for the market; (3) determining the profitability of each market plan; and (4) selecting from the set of market plans a subset optimizing overall profit of the schedule.

Both the foregoing general description and the following detailed description are exemplary and explanatory only, and merely provide further explanation of the claimed invention.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

DETAILED DESCRIPTION

Reference will now be made in detail to an implementation of the present invention as illustrated in the accompanying drawings. Wherever possible, the same reference numbers will be used throughout the drawings and the following description to refer to the same or like parts.

Overview

Figure 2:
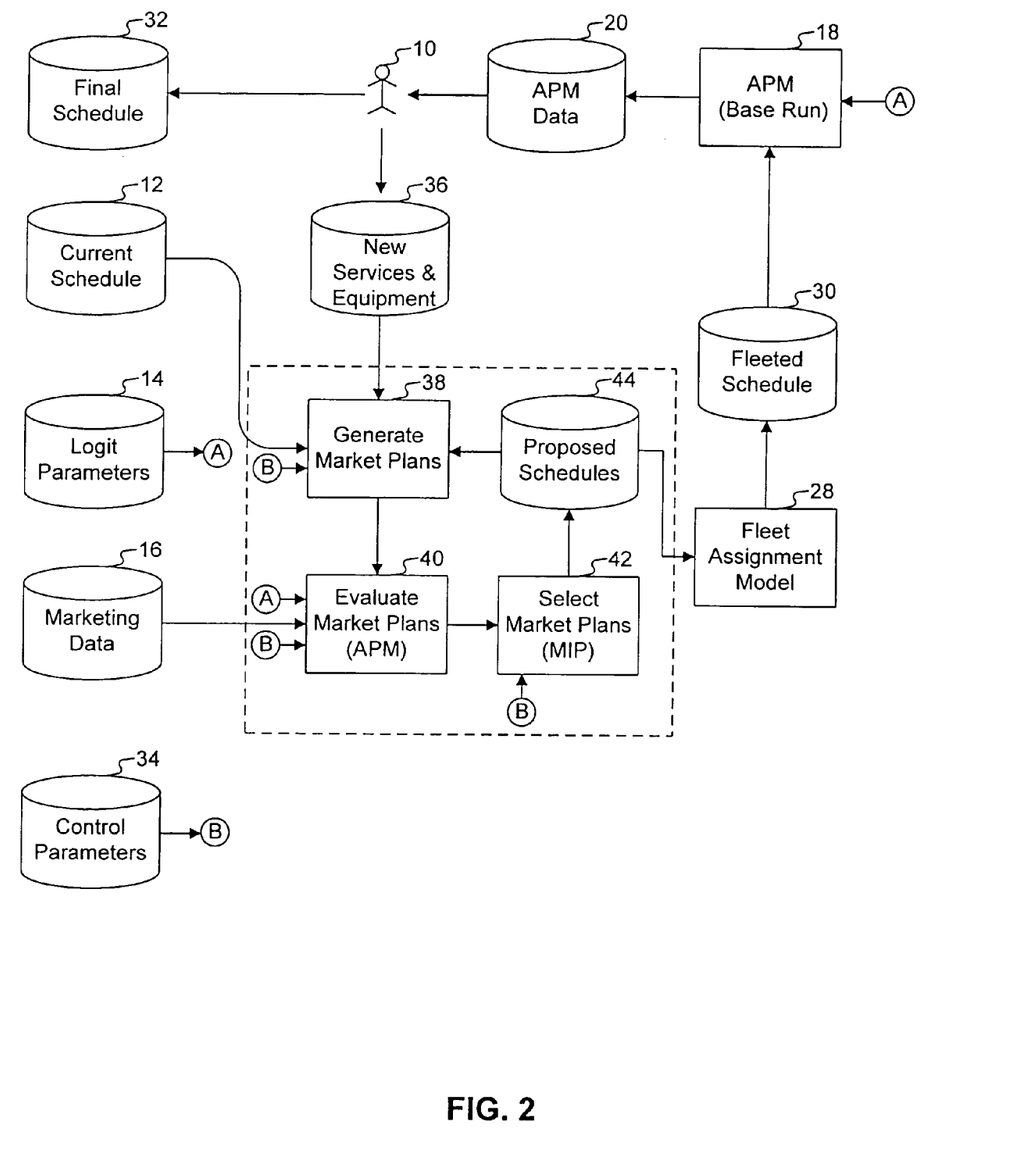
FIG. 2 is a schematic block diagram showing aspects of the present invention.

FIG. 2 is a high-level view of the process of the present invention. To begin, the scheduler 10 inputs data 36 identifying new flights (or services), and suggested equipment for use by such flights, which is automatically considered for entry into a final schedule 32. Employing the current schedule 12, the new flights and equipment data 36, and a group of scheduler-selected control parameters 34, a comprehensive set of market plans are generated for each market of interest in step 38. As will be discussed in detail below, a market plan is an automatically-generated list of itineraries for serving a city-pair called a market.

In step 40, an APM is conventionally employed to evaluate the market plans and produce estimated cost, demand, and revenue for each market plan. In so doing, the APM utilizes logit parameters 14 set in a well-known manner by the scheduler 10, the control parameters 34, and marketing data 16. In step 42, a conventional mathematical program solver, pre-programmed with a mixed integer program (MIP), considers the control parameters 34 and all of the market plans to select an optimal subset of market plans. This selection is made according to the MIP's predefined problem and constraints such that the selected subset of market plans produces an optimized overall profit for the resulting proposed schedule 44.

Using the proposed schedule 44, a new set of market plans may be generated in step 38, and if so, the sequence shown in the dashed-line box of FIG. 2 is repeated until a predefined termination condition is met. Specifically, the scheduler 10 may set a control parameter 34 to limit the number of iterations to a fixed number count. Alternatively, the scheduler 10 may set a threshold increase in the overall estimated profit between subsequent iterations. Below this threshold, the iterations will automatically terminate.

In either case, a proposed schedule 44 identifying a set of optimum market plans for each market is ultimately sent to the FAM 28, which produces in a conventional manner a fleeted schedule 30. Thereafter, a conventional APM base run 18 is performed on the optimized fleet schedule 30 to produce APM data for scheduler review.

Computer Architecture

Figure 3:
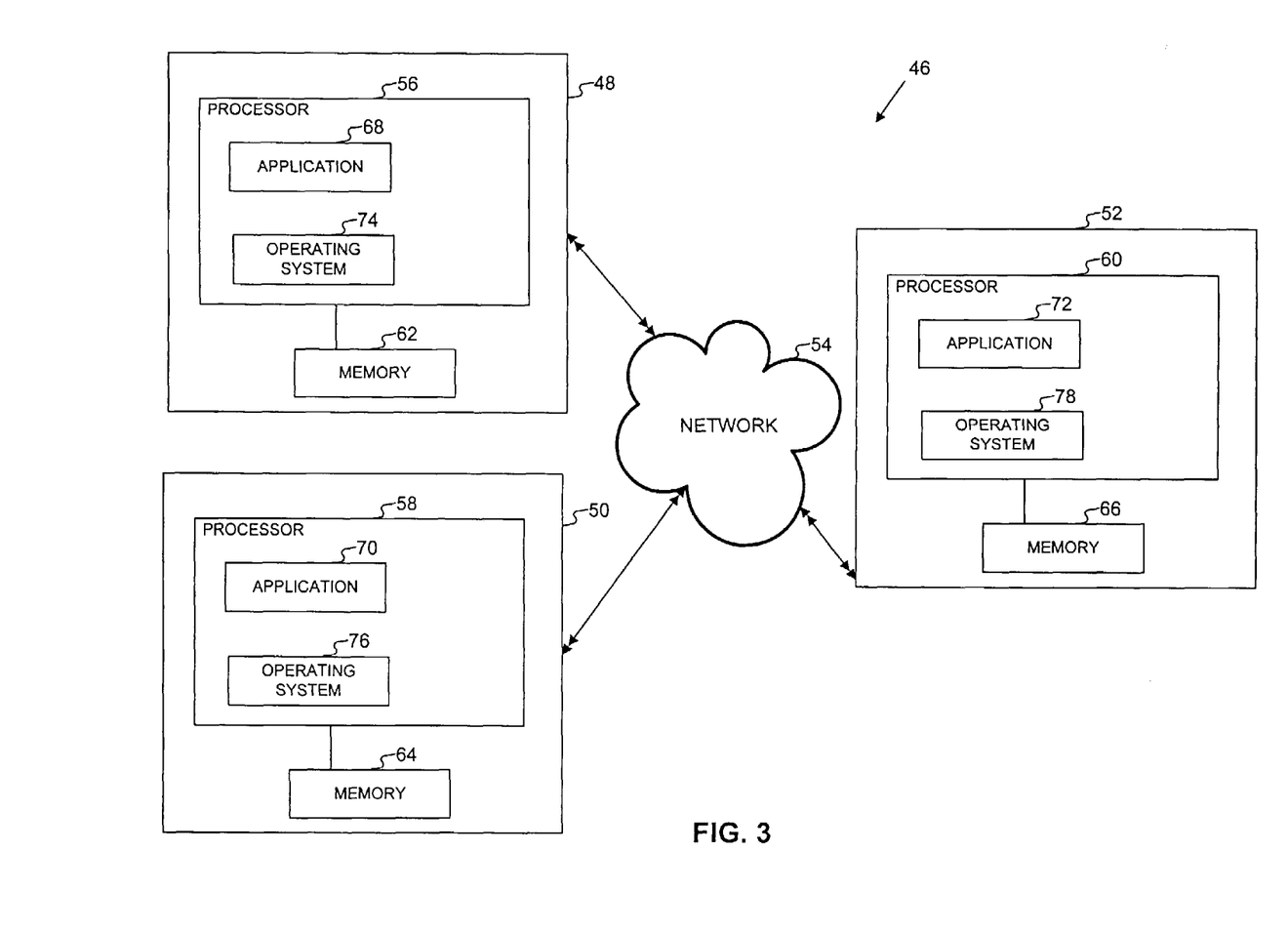
FIG. 3 is a schematic block diagram depicting a hardware configuration for employing the present invention.

FIG. 3 illustrates a distributed processing system 46 which can be used to implement the present invention. In FIG. 3, the distributed processing system 46 contains three independent and heterogeneous platforms 48, 50, and 52 connected in a network configuration represented by the network cloud 54. The composition and protocol of the network configuration represented in FIG. 3 by the cloud 54 is not important as long as it allows for communication of the information between platforms 48, 50 and 52. In addition, the use of just three platforms is merely for illustration and does not limit the present invention to the use of a particular number of platforms. Further, the specific network architecture is not crucial to this invention. For example, another network architecture that could be used in accordance with this invention would employ one platform as a network controller to which all the other platforms would be connected. Additionally, one could employ a single independent platform, and in any event, one or more schedulers 10 would oversee the schedule generation process from one or more of the platforms.

In the implementation of distributed processing system 46, platforms 48, 50 and 52 each include a processor 56, 58, and 60 respectively, and a memory, 62, 64, and 66, respectively. Included within each processor 56, 58, and 60, are applications 68, 70, and 72, respectively, and operating systems 74, 76, and 78, respectively.

Applications 68, 70, and 72 can be programs that are either previously written and modified to work with the present invention, or that are conventionally written to take advantage of the services offered by the present invention. Applications 68, 70, and 72 invoke operations to be performed in accordance with this invention.

Operating systems 74, 76, and 78 are standard operating systems tied to the corresponding processors 56, 58, and 60, respectively. The platforms 48, 50, and 52 can be heterogenous or homogenous.

Memories 62, 64, and 66 serve several functions, such as general storage for the associated platform. Another function is to store applications 68, 70, and 72, and operating systems 74, 76, and 78 before execution by the respective processor 56, 58, and 60. In addition, portions of memories 62, 64, and 66 may constitute shared memory available to all of the platforms 48, 50, and 52 in network 46.

Leg Generation Phase

Figure 4:
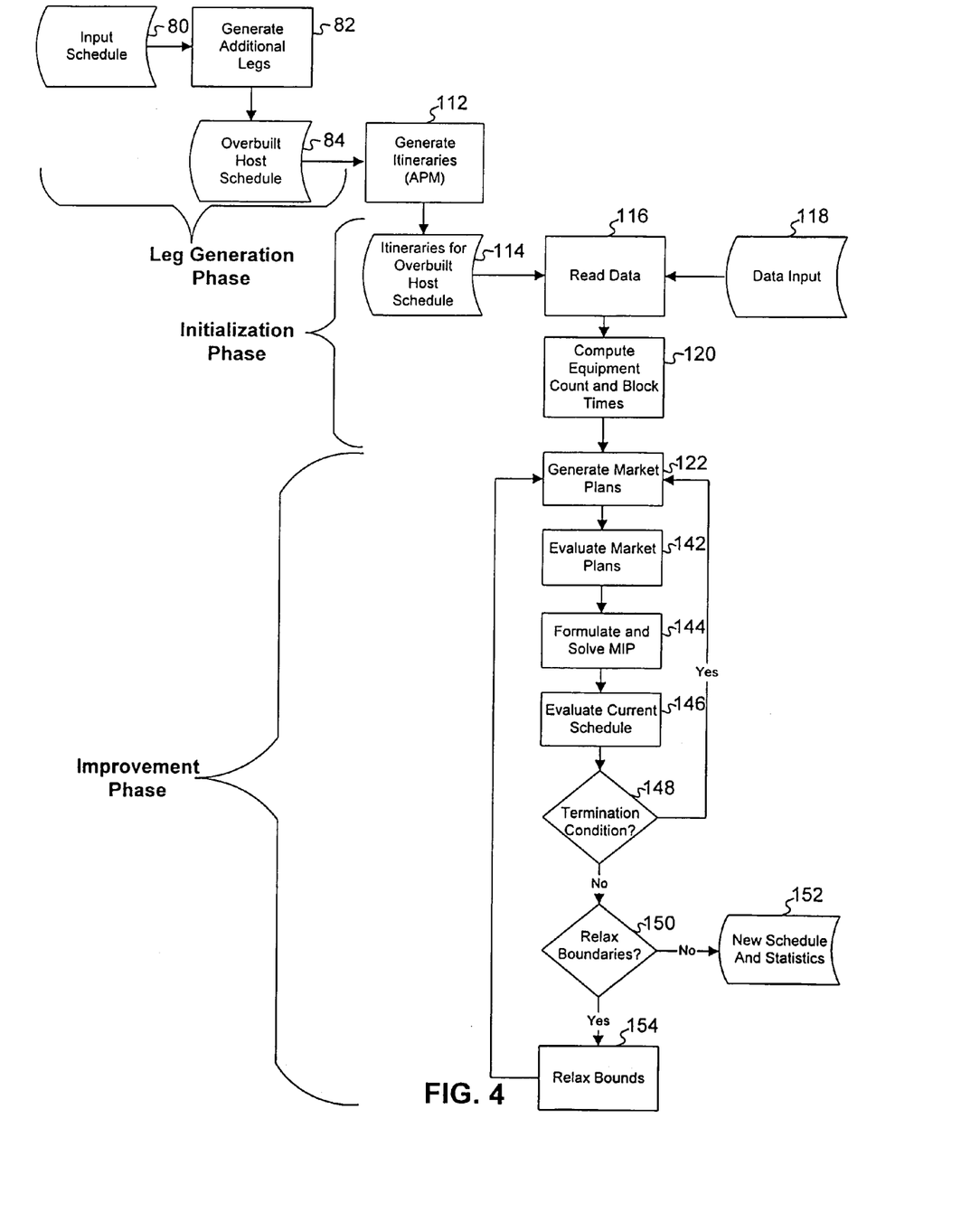
FIG. 4 is a flowchart depicting aspects of the process for schedule generation.

The primary purpose of the leg generation phase shown in FIG. 4 is to create an overbuilt host schedule (OHS). The OHS is referred to as "overbuilt" because it includes not only HA legs that are actually scheduled for flight, but also a number of HA legs not presently scheduled for HA flight, but which may be subsequently incorporated into the HA schedule if deemed appropriate. Employing the OHS in the schedule generation process, as discussed below, increases the number of proposed schedule changes that may be efficiently considered above that previously possible.

In step 80, the provided input data includes: (1) an input schedule identifying all HA legs scheduled for flight, and which may include for each leg an origination, a destination, departure and arrival times, and equipment assigned to the leg; (2) a list of new leg(s), if desired, for consideration as entries to the schedule, and which may each include identification of desired origination, destination, arrival and departure times, and equipment assigned to the leg (or a group of potential equipment types from which one may be selected); (3) a list of curfew times for each airport, representing times that aircraft arrival or departure is not permitted at a specified airport; (4) a list of HA hub stations, meaning airports heavily serviced by the HA; (5) a list of time points, each representing a midpoint of a different specified time period (called a complex) during which HA flights may arrive or depart at a particular airport; (6) a list of one or more arrival time bandwidths, the appropriate bandwidth being applied before and after a specified arrival time point to define an arrival complex for a specified airport; and (7) a list of one or more departure time bandwidths, the appropriate bandwidth being applied before and after a specified departure time point to define a departure complex for a specified airport.

In step 82, the input schedule, including the scheduled HA legs, and the list of new leg(s), if any, are first organized and then processed for leg generation. The organization process is represented by the sequence shown in FIG. 5, and the leg generation scheme is represented by FIGS. 6A-C, and their accompanying description below.

Figure 5:
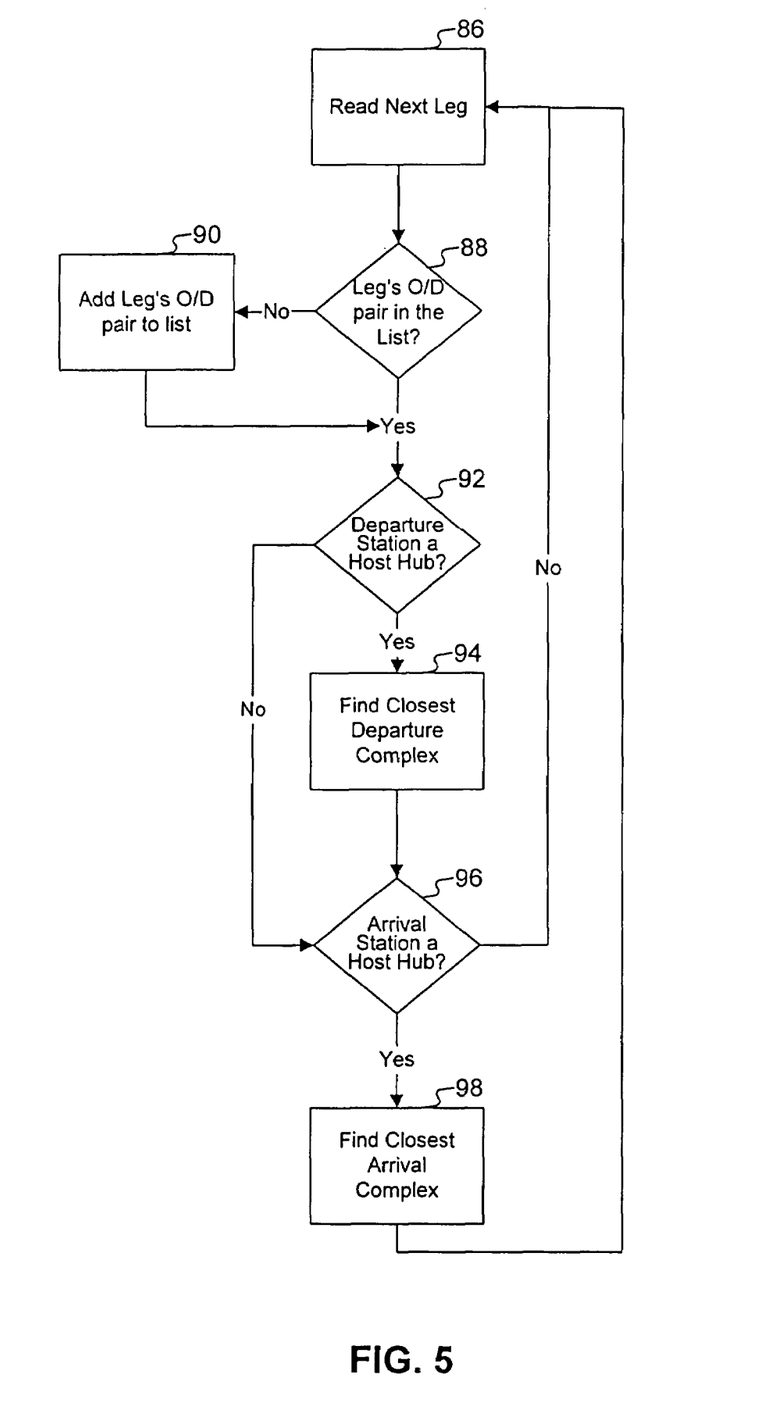
FIG. 5 is a flowchart depicting aspects of the process of FIG. 4.
Figure 6A:
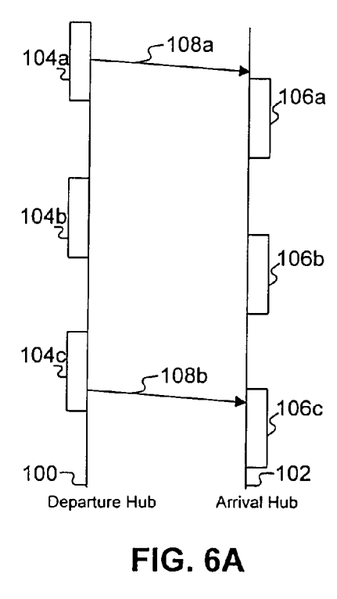
FIGS. 6A-C is a schematic representation depicting aspects of the process of FIG. 4.
Figure 6B:
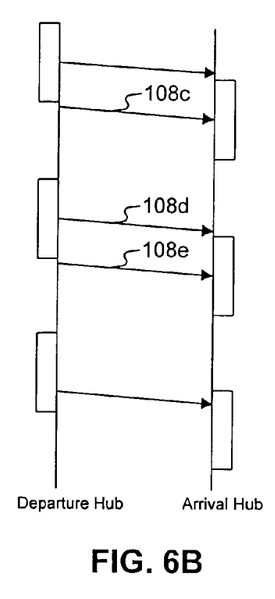
Figure 6C:
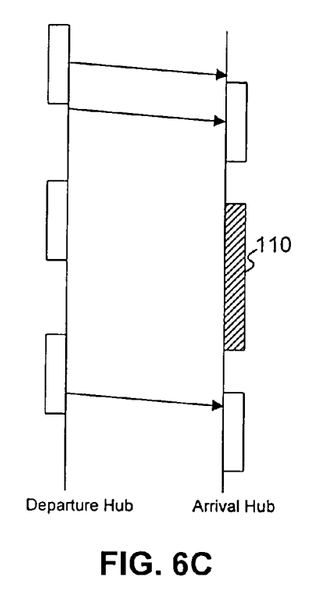

Turning first to FIG. 5, its sequence creates a list of all legs in the input schedule, to identify which of the previously-specified arrival and departure complexes of the hub stations are served by one or more HA leg. Specifically, in step 86 each leg of the input schedule is read in turn, and if it is determined in step 88 that the origination and destination pair of the subject leg is not already on the specified list, then the leg's origination and destination pair is added to the list in step 90. Assuming that a leg under consideration is part of the specified list, at step 92 it is determined whether the leg's departure station is a HA hub station. If so, in step 94 the closest departure complex is identified to see if the leg's departure time falls within the departure complex's time window. The list is then updated to indicate whether or not the leg's departure time falls within its closest departure complex time window. If in step 92, it is determined that the leg's departure station is not a HA hub station, or after step 94, a similar determination is made concerning the leg's arrival station in steps 96 and 98.

Specifically, in step 96 it is determined whether the leg's arrival station is a HA hub station. If not, the next leg in the input schedule is read at step 86. However, if the present leg's arrival station is a HA hub station, then in step 98 the closest arrival complex is identified to see if the leg's arrival time falls within the arrival complex's time window. The list is then updated to indicate whether or not the leg's arrival time falls within its closest arrival complex time window. The sequence of steps 86-98 is repeated to allocate to the specified list each unique origination and destination pair from the legs of the input schedule, as well as whether a leg serves a HA hub, and whether a leg serves a particular departure or arrival time complex.

After reading the entire input schedule, additional legs are automatically generated for all services that are contained in the input schedule that either start or end at a HA hub station. As used herein, the term, "service," means one or more flights traveling at different times within a planning horizon (i.e., a scheduler-selected time period) between a market's city pair (e.g., a HA's flight(s) from Washington, D.C. to New York over a day). The automatic generation of additional legs is demonstrated by the example sequence shown in FIGS. 6A-C.

Specifically, FIG. 6A represents a HA departure hub 100, including a number of HA departure complexes 104a-c; a HA arrival hub 102, including a number of HA arrival hubs 106a-c; and a pair of HA legs 108a and 108b. The HA legs 108a and 108b represent HA legs from the input schedule, from the list of new leg(s), if any, or from a combination of both. In any event, the legs 108a and 108b serve (i.e., intersect) complexes 104a, 104c, and 106c. This means that complexes 104b, 106a, and 106b are not served, as shown in FIG. 6A.

Additional legs are then generated to cover the unserved complexes, as best represented by FIG. 6B. A copy of an existing leg (e.g., 108a or 108b) in the service is generally copied, and then employed with each of the unserved complexes 104b, 106a, and 106b. Out of convenience, a copied leg is merged with the midpoint of each of the unserved complexes. For example, note that added legs 108c, 108d, and 108e intersect the respective midpoints of their corresponding complexes 106a, 104b, and 106b. It is noted that using for additional legs a copy of an existing leg in a service, as well as merging the new leg with the midpoint of an unserved complex, are merely exemplary, as other schemes could be employed, if desired.

Referring to FIG. 6C, a curfew time 110 is added to the arrival hub 102, meaning that aircraft arrival is prohibited during this time period. Consequently, two of the three additional legs (i.e., 108d and 108e) generated in FIG. 6B are suppressed by the curfew time 110. The resulting legs for service in the HA market defined by departure hub 100 and arrival hub 102 are the two originally-generated legs 108a and 108b, and the newly generated leg 108c.

At the close of the leg generation phase, as best seen in FIG. 4, the OHS is provided in step 84 to a conventional APM to generate itineraries at step 112 in a well-known manner. Here, other airline (OA) schedules are also employed with the OHS to produce itineraries encompassing both the HA and OAs.

Initialization Phase

During the initialization phase, various data are assembled and input for use in the improvement phase, discussed below. At step 114, the APM-generated itineraries for the HA and OA are assembled for input at step 116.

Among the data read in step 116 are the following inputs provided in step 118: (1) the OHS which may be used to, among other purposes, distinguish between legs that are actually scheduled for flight in the input schedule of step 80, and additionally-generated legs that are not presently scheduled for flight; (2) logit parameters comprising a well-known group of logit-based parameters employed by an APM; (3) marketing data typically provided for conventional APM operation, including for example: fares offered in each market, demand for each market, time of day curves, and the like; (4) equipment data routinely used by a conventional APM, including by way of example: the time to turn around from arrival to departure for each equipment type (turnaround time), the number of planes of a given type in the HA fleet (plane count), the duration that the HA plane count can serve within a given period of time (block time), HA aircraft types, and HA seat capacity for each equipment type, and the like.

Also input at step 116 are various control parameters employed during the improvement phase. Among the control parameters that are input are the following: (1) minimum origin point of presence (OOP), meaning the minimum total number of HA departures at a specified station for a specified time period; (2) maximum OOP, meaning the maximum total number of HA departures at a specified station for a specified time period; (3) threshold OPP, which if set/(not set), means that the OPP must/(may or may not) fall between the specified minimum and maximum OPPs; (4) minimum service frequency, meaning the minimum service frequency (i.e., number of flights over a specified time period) for a specified service; (5) maximum service frequency, meaning the maximum service frequency for a specified service; (6) threshold service frequency, which if set/(not set), means that the service frequency must/(may or may not) fall between the specified minimum and maximum service frequencies; (7) required markets and legs; and (8) termination condition(s), which are discussed below for use in determining the number of iterations to be performed in the improvement phase.

At the conclusion of the initialization phase, a HA equipment count and block time are obtained in step 120, for subsequent use in the improvement phase. Step 120 may be performed by programming a conventional mathematical solver program with a mixed integer program (MIP) with constraints defining a suitable time-space network, such as the MIP shown in attached Appendix A. This MIP example looks at the scheduled HA legs from the input schedule to determine when and where HA aircraft go into and out of service. Also determined are how many HA flight hours are available, as well as a plane count by equipment type.

Alternatively, the scheduler 10 may input such data directly into the system, without employing the above-noted MIP, or another one similar thereto. Moreover, the scheduler 10 may wish to input such data based on a hypothetical HA fleet, irrespective of the actual HA input schedule.

Improvement Phase (Market Plan Generation)

At the outset, it is noted that the name of this section, "Improvement Phase," is not necessarily intended to delineate the metes and bounds of the invention.

Figure 7:
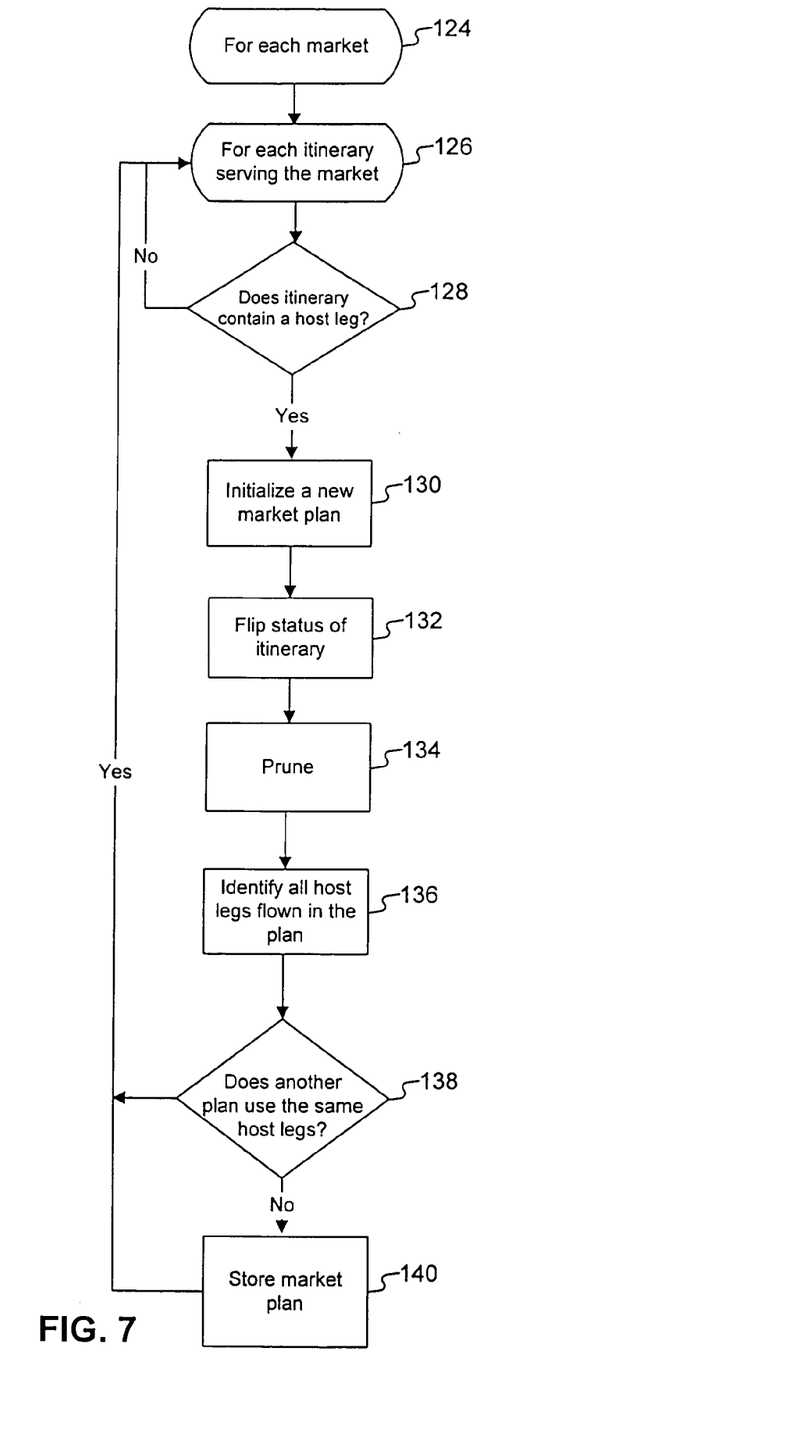
FIG. 7 flowchart depicting aspects of the process of FIG. 4.

At step 122, a number of market plans are generated in a process represented by the sequence shown in FIG. 7. In step 124, a first HA market is taken up for consideration, for example the Dallas to Seattle market. In step 126, each itinerary that does or could serve the subject market is known. Here, assume that three itineraries serve or could serve the market (e.g., I1=Dallas to Seattle, I2=Dallas to San Francisco to Seattle, and I3=Dallas to Phoenix to Seattle). Then, itinerary I1 is taken up, and it is determined in step 128 whether I1 has a HA leg. If no HA leg is included in I1, which consists of a single leg here, the next itinerary I2 would be taken up for consideration.

Assuming that the leg forming I1 is a HA leg, a first market plan is initialized in step 130. In step 132, the status of itinerary I1 is flipped, and the status of the remaining itineraries I2 and I3 is not changed. For instance, if the baseline set of itineraries for serving the market was: itinerary I1 (flown) and itineraries I2 and I3 (not flown), then the first market plan would consist of flipping itinerary I1 (i.e., from flown to not flown) and leaving itineraries I2 and I3 as not flown. In step 134, conventional elapsed time pruning is performed on the active (or flown) itineraries in the first market plan, of which there are none. In step 136, all HA legs are identified in the active itineraries, of which there are none here. In step 138, it is determined whether a previously-stored market plan uses the same set of HA legs as determined in step 136. If so, the market plan is not stored, and if not, the market plan is stored in step 140. Here, since only one market plan has been considered thus far, the first market plan is stored. However, the system may be set up to not store inactive market plans, as here, to save computing resources.

Having considered the first market plan, the process returns to step 126 to consider the next itinerary I2. Again, it is determined in step 128 whether I2 has a HA leg. If no HA leg is included in I2, the next itinerary I3 would be taken up for consideration.

Assuming that I2 includes a HA leg, a second market plan is initialized in step 130. In step 132, the status of itinerary I2 is flipped, and the status of the remaining itineraries I1 and I3 are not changed. Continuing with the example, this means that in the second market plan itineraries I1 and I2 would be flown (having flipped I2), while itinerary I3 would not be flown. In step 134, conventional elapsed time pruning is performed on the active (or flown) itineraries in the second market plan. Specifically, if one or more legs are shared between active itineraries, then the itinerary that is shortest in duration will remain active, while the remaining active itineraries in this comparison are turned off. In step 136, all HA legs are identified in the active itineraries of the second market plan (here, itineraries I1 and I2). In step 138, it is determined whether a previously-stored market plan uses the same set of HA legs as determined in step 136. If so, the market plan is not stored, and if not, the market plan is stored.

Having stored the second market plan in step 140, the process returns to step 126 to consider the next itinerary I3. Again, it is determined in step 128 whether I3 has a HA leg. If no HA leg is included in I3, the next market and its assigned itineraries would be taken up for consideration.

Assuming that I3 includes a HA leg, a third market plan is initialized in step 130. In step 132, the status of itinerary I3 is flipped, and the status of the remaining itineraries I1 and I2 are not changed. Continuing with the example, this means that in the third market plan itineraries I1 and I3 would be flown (having flipped I3), while itinerary I2 would not be flown. In step 134, conventional elapsed time pruning is performed on the active (or flown) itineraries in the third market plan. In step 136, all HA legs are identified in the active itineraries of the third market plan (here, itineraries I1 and I3). In step 138, it is determined whether a previously-stored market plan uses the same set of HA legs as determined in step 136. If so, the market plan is not stored, and if not, the market plan is stored.

Improvement Phase (Market Plan Evaluation)

Returning to FIG. 4, after completing step 122, a number of market plans have been generated for all HA markets, each market plan representing a different alternative for serving a respective HA market.

In step 142, an APM is conventionally employed to evaluate each market plan, one at a time. Specifically, the APM estimates for each market plan include: (1) anticipated revenue, (2) spill cost for each leg, (3) fixed and variable costs for each leg, (4) demand for each leg, (5) cost to operate each airport, and (6) the cost to operate each flight. This data is subsequently utilized to help select an appropriate subset of market plans for the schedule.

Improvement Phase (Market Plan Selection)

Still referring to FIG. 4, at step 144, a conventional program solver is employed to formulate and solve a mixed integer program (MIP), which is utilized to select a subset of market plans that is consistent across all markets and maximizes overall HA profit. Appendix B sets forth such a MIP, and includes the MIP's equations, a description of the MIP's variables, and a description of the MIP's objective function and constraints. Those with skill in the art understand the operation of the disclosed MIP to perform the recited function, and further appreciate that various other MIPs may be employed to perform similar market plan selection functions, if desired. Incorporated herein by reference is an additional resource concerning MIPs entitled *Integer and Combinatorial Optimization*, authored by G. L. Nemhauser and L. A. Wolsey, and published by John Wiley & Sons, Inc., 1988.

In selecting market plans to serve the various markets, the MIP may assign to each market plan a separate valuation, representing a percentage of the estimated full demand (or number of potential passengers) that could be served by the subject market plan. In this regard, the MIP may be formulated to provide fractional valuations for the market plans, meaning that a given market plan having a fractional valuation is anticipate to cover a fractional portion of its potential full demand.

By way of example, a market plan estimated to have a demand of 100 passengers and having an assigned valuation of 1.0 would be operated, and in so doing, anticipated to cover all 100 passengers (the market plan's full demand). Any other market plans in the same market would have assigned market plan valuations of zero, as the MIP constrains the sum of market plan valuations in the same market to one; however, the MIP may alternatively restrict this sum to any fixed value, including one, within a suitable range of values. Market plans with valuations of zero are not operated.

In contrast, a market plan with a non-zero valuation of less than one is still operated, but it may not be anticipated to cover its full potential demand. For instance, in a market with two market plans MP1 and MP2, assume that the full estimated demand is 100 passengers for MP1, and 200 passengers for MP2. If the MIP assigns fractional valuations to the market plans MP1 and MP2 of 0.4 and 0.6, respectively, this means that both market plans MP1 and MP2 will be operated; however, the estimated demand serviced by each market plan would be 40 passengers (0.4×100 passengers) and 120 passengers (0.6×200 passengers), respectively.

As suggested by the example above, assignment of fractional valuations for the market plans permits having more than one market plan serving a particular market. This may be desirable to increase offered services in suitable markets (e.g., where demand is high). However, increasing offered services in one market, may impact the ability to serve other markets, as an airline has finite resources to implement its schedule. The MIP takes this into account in selecting a subset of market plans intended to optimize overall profitability of the schedule.

Improvement Phase (Schedule Evaluation)

In step 146, an APM is conventionally employed to evaluate the subset of market plans selected by the MIP, recalling that the subset of selected market plans forms a proposed, optimum schedule. As is known in the art, the APM provides cost, revenue, and demand estimates for subsequent evaluation.

In step 148, termination conditions are evaluated to see if additional iterations of steps 122, and 142-148 are to be executed. Specifically, the scheduler 10 may have input at step 116 a value establishing a fixed number of such iterations to be performed. Alternatively, the scheduler 10 may have input a threshold overall profitability value above which subsequent computations of step 146 must stay in order to perform subsequent iterations. Additional alternative termination criteria may be employed, as desired. Assuming that additional iterations are to be performed, then the selected schedule from step 144 is used as an input to step 122 to generate new market plans.

In step 150, the scheduler 10 has the option to change certain desired boundary conditions in step 154. If the scheduler 10 decides not to relax boundary conditions, a new optimized schedule and related statistics are provided at step 152, which are then processed by the FAM 28 and APM 18 in FIG. 2 to complete fleet scheduling of the optimized schedule, and to produce final APM estimations for the schedule.

Of course, if the scheduler 10 opted to change boundary conditions in step 150, then new boundaries conditions are input, as desired. For example, the scheduler 10 may want to change the minimum or maximum permissible service frequency, or OPP, for subsequent evaluation employing the process, as discussed above.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the manner of modifying a set of itineraries to form market plans could be varied, as desired. Additionally, while the general field of use for the invention has been described as the airline industry, it could similarly be employed in other transportation industries. The scope of the invention is defined by the claims and their equivalents.

What is claimed is:

1. A computer implemented method for optimizing a schedule of legs employed by at least one service provider in transporting objects between geographic markets, the method comprising the steps of:
    a) identifying a set of itineraries for serving each market in a set of markets, each itinerary comprising one or more legs;
    b) generating a set of market plans for each of a plurality of markets, wherein the set of market plans for each market comprises a plurality of market plans with each market plan comprising a modified set of the itineraries for the market;
    c) individually determining the profitability of each market plan for each market following generation of new set of market plans for each of the plurality of markets; and
    d) selecting from the set of market plans for each market a subset optimizing overall profit of the schedule while accounting for resources of a service provider, wherein the subset of market plans is selected following a determination of the profitability of each market plan for each market,
    wherein at least one of the identifying, generating, determining and selecting steps is performed by a computer processor.

2. The method of claim 1, wherein the generating step includes the substeps of:
    a) changing a status parameter of one of the itineraries in the set of itineraries while leaving the status parameters for the remaining itineraries unchanged; and
    b) repeating said changing step for each itinerary in the set.

3. The method of claim 1, wherein market plans are generated utilizing itineraries including at least one leg from a specified service provider.

4. The method of claim 1, wherein the determining step employs a profitability model.

5. The method of claim 1, wherein the selecting step employs a mixed integer program to select the subset of market plans to maximize overall profit of the schedule.

6. The method of claim 1, further including the step of evaluating a termination condition to determine whether additional market plans will be generated using the subset of market plans.

7. The method of claim 1, wherein the identifying step includes the substep of generating the set of itineraries based on at least scheduled legs and automatically-generated hypothetical legs of a specified service provider.

8. A system including one or more computers executing applications for optimizing a schedule of legs employed by at least one service provider in transporting objects between geographic markets, the system comprising:
   a) a component configured to identify a set of itineraries for serving each market in a set of markets, each itinerary comprising one or more legs;
   b) a component configured to generate a set of market plans for each of a plurality of markets, wherein the set of market plans for each market comprises a plurality of market plans with each market plan comprising a modified set of the itineraries for the market;
   c) a profitability model configured to individually determine the profitability of each market plan for each market following generation of new set of market plans for each of the plurality of markets; and
   d) a mixed integer program configured to select from the set of market plans for each market a subset optimizing overall profit of the schedule while accounting for resources of a service provider, wherein the subset of market plans is selected following a determination of the profitability of each market plan for each market.

9. The system of claim 8, wherein the component configured to generate a set of market plans is further configured to:
   a) change a status parameter of one of the itineraries in the set of itineraries while leaving the status parameters for the remaining itineraries unchanged; and
   b) repeat said changing step for each itinerary in the set.

10. The system of claim 8, wherein market plans are generated utilizing itineraries including at least one leg from a specified service provider.

11. A computer program product having computer readable instructions embodied in a computer-readable medium for programming a computer to optimize a schedule of legs employed by at least one service provider in transporting objects between geographic markets, by performing the steps of:
   a) identifying a set of itineraries for serving each market in a set of markets, each itinerary comprising one or more legs;
   b) generating a set of market plans for each of a plurality of markets, wherein the set of market plans for each market comprises a plurality of market plans with each market plan comprising a modified set of the itineraries for the market;
   c) individually determining the profitability of each market plan for each market following generation of new set of market plans for each of the plurality of markets; and
   d) selecting from the set of market plans for each market a subset optimizing overall profit of the schedule while accounting for resources of a service provider, wherein the subset of market places is selected following a determination of the profitability of each market plan for each market.

12. The computer program product of claim 11, wherein the generating step includes the substeps of:
   a) changing a status parameter of one of the itineraries in the set of itineraries while leaving the status parameters for the remaining itineraries unchanged; and
   b) repeating said changing step for each itinerary in the set.

13. The computer program product of claim 11, wherein market plans are generated utilizing itineraries including at least one leg from a specified service provider.

14. The computer program product of claim 11, wherein the determining step employs a profitability model.

15. The computer program product of claim 11, wherein the selecting step employs a mixed integer program to select the subset of market plans to maximize overall profit of the schedule.

16. The computer program product of claim 11, further including the step of evaluating a termination condition to determine whether additional market plans will be generated using the subset of market plans.

17. The computer program product of claim 11, wherein the identifying step includes the substep of generating the set of itineraries based on at least scheduled legs and automatically-generated hypothetical legs of a specified service provider.

* * * * *